(No Model.) 2 Sheets—Sheet 1.
H. C. REW.
SYSTEM OF MAINS AND PIPES FOR THE DISTRIBUTION OF GAS OR OTHER FLUIDS.
No. 290,925. Patented Dec. 25, 1883.
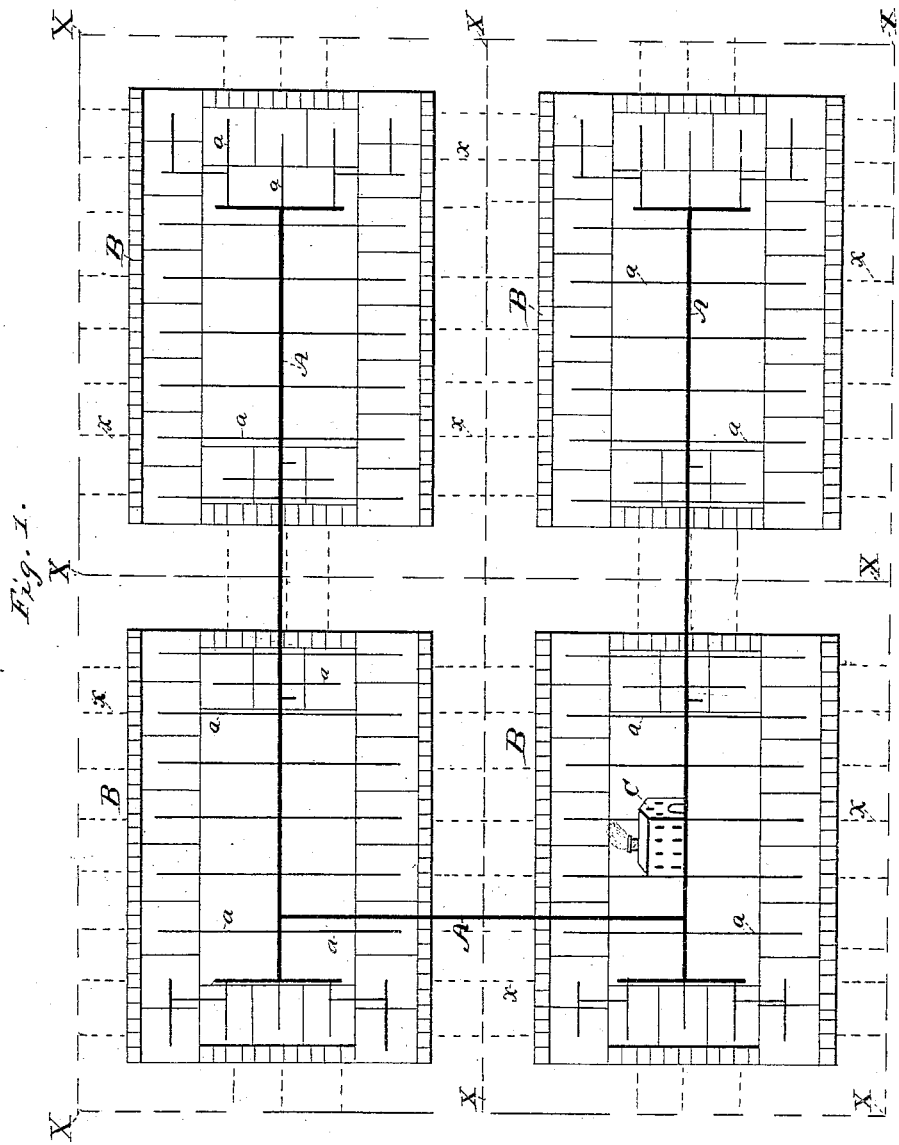
WITNESSES
Chas. R. Burr
W. E. Bowen
INVENTOR
Henry C. Rew
per O. E. Duffy
Attorney

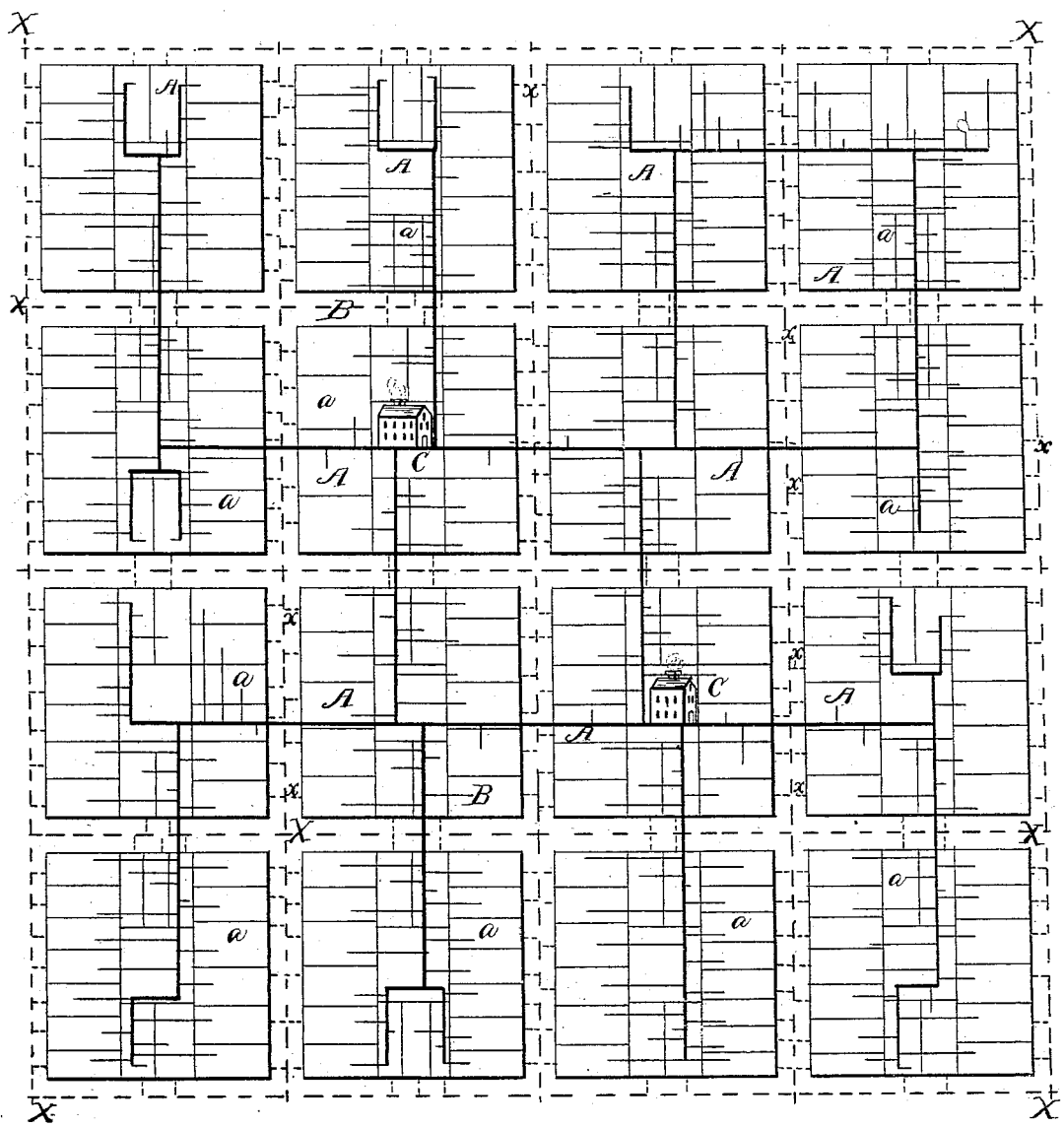

UNITED STATES PATENT OFFICE.

HENRY C. REW, OF CHICAGO, ILLINOIS.

SYSTEM OF MAINS AND PIPES FOR THE DISTRIBUTION OF GAS OR OTHER FLUIDS.

SPECIFICATION forming part of Letters Patent No. 290,925, dated December 25, 1883.

Application filed May 4, 1883. (No model.)

*To all whom it may concern:*

Be it known that I, HENRY C. REW, of Chicago, in the county of Cook and State of Illinois, have invented certain new and useful Improvements in Systems of Mains and Pipes for the Distribution of Gas or other Fluids; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to a system of mains and pipes for distributing gas or other fluids for lighting or heating purposes in cities and villages, which system is applicable also in the distribution of hot or cold water, or other fluids, and steam or hot air; and the object of my invention is to cheapen and simplify the construction and arrangement of mains or conduits, first, by piping sections or districts in any given territory, embracing numerous blocks and squares by a system of mains or conduits and service-pipes which shall fully extend to every building in said territory with a great reduction in the length of pipe previously used in supplying the same territory, thereby effecting a saving in excavating the necessary trenches by lessening the length of the same, and also by avoiding the tearing up and relaying of pavement and flagging. The result is, the provision of a better and cheaper method of laying large mains in cities, the streets of which are already overcrowded with numerous mains and conduits. Heretofore in the laying of gas, water, and steam pipes in the streets of cities, and in constructing sewers and conduits, they have been laid and constructed in the streets of the cities and in line therewith. To lay and construct the same and to run service and exhaust pipes to the various buildings has required the tearing up and replacing of the pavements of the streets and heavy flagging of the sidewalks, which has been done at heavy expense, at the same time greatly discommoding the traffic in the streets and endangering life and property. Furthermore, many streets in cities where there is a dense population are already so fully occupied with pipes and conduits of various kinds that the economical laying of the large pipes now required for additional gas, water, steam, and other supplies is practically out of the question. The necessities of the case require a different and better system, and I have discovered that by constructing works for the supply of gas, water, steam, and other supplies in or near the center of a square or blocks of buildings, and by running the necessary mains from the works under or through the adjoining buildings and across the streets at right angles, or at such angles as can be most conveniently formed, to the centers of adjoining blocks or squares, a system of mains and conduits can be laid that will require less than half the piping and excavating now ordinarily used, and that will enable the company or individuals operating the same to greatly diminish the cost of the necessary works, and consequently supply the public demand for gas, water, steam, &c., at greatly-reduced prices. By running my service-pipes from the mains to consumers from the interior of the blocks or squares to the rear of the surrounding buildings, I avoid entirely the tearing up of the street pavements and flagging, and the work is done and the pipe is laid where it is removed from the traffic and danger of the streets, and consequently at a greatly-reduced cost, as the same is placed where it does not require covering with flagging or pavement of any kind.

Heretofore, also, the works built to supply gas to cities have been built in outlying districts distant from the centers of population, owing to the great space required and the large and dangerous tanks or holders in which the gas has been stored. The bringing to perfection of my system of manufacturing gas, which contemplates the delivery of gas as a common article of fuel by a practically automatic process and without the use of holders, will now render practicable the construction of gas-generators in central blocks of cities; but the large amount of gas required for fuel purposes will still require the use of large mains and supply-pipes, for which my invention in piping is admirably adapted. If gas be supplied at so low a rate as to cause it to supersede the use of coal or other crude material as an article of fuel, the capacity of the supply-pipes must be at least one thousand times greater than is required if it be supplied for illuminating purposes alone, and it is clear that no such mains as would be required to supply that amount of gas from outlying works can be laid without an enormous expense for the series of very large mains and tunneling that would be required, and it is practically out of the question by any present system of piping. To overcome these difficulties, and to provide a method particularly of delivery of gas for fuel, is one of the principal objects of my invention.

Having stated the nature and object of my invention, I will now proceed to describe it more particularly with reference to the accompanying drawings, in which—

Figure 1 represents a plan view of my system of mains and service-pipes extending into and connected with buildings of four blocks or squares of a city. Fig. 2 represents a plant of mains and service-pipes connected with sixteen blocks or squares of buildings of a city.

The heavy black lines A designate the mains located and extended through the centers or interior portions of the blocks B according to my invention. The generating-furnaces, purifiers, and other parts of the apparatus necessary for manufacturing the gas are located in the building C, situated in the central portion of a block of buildings. The service-pipes $a$ are shown branching from the mains entirely within the central portions of the blocks. The dotted lines designated by letter X represent mains laid through the streets between the blocks according to the plan now in general use, and the letter $x$ designates the service-pipes in dotted lines connecting such mains to the houses in the block.

It is readily seen that by laying the mains or conduits through the centers of the blocks and across streets the length required to reach the buildings in every block of a certain district or territory is much less than that required in laying the mains through the streets around the blocks. Another great advantage gained is that by running the mains through the exterior portions of the blocks and the service-pipes therefrom to the rear of the buildings, the tearing up and replacing of pavements, flagging, car-tracks, interference with sewers, tunnels, &c., is entirely avoided, and the great expense incident thereto is saved, and the pipes are laid where they can be readily reached for repairs, alterations, or new connections whenever necessary.

It will be apparent from the foregoing description, and from the plans shown in the drawings, that my invention contemplates the location of gas-generating plants in various sections of the village or city which is to be supplied, and the supplying of gas to such sections or districts by means of mains running through the interior of each square and crossing the streets at or about at a right angle to the course thereof, thus avoiding, as described, the running of mains in the direction of the same.

It has already become obvious that in the near future the consumption of gas for heating and cooking purposes will be vastly greater than it now is, and it would not be difficult to demonstrate that in large cities no main could be constructed—from lack of capacity in the streets—of sufficient dimensions to convey a supply of gas requisite for such consumption if brought from a single central source, or even if it be brought from three or four distinct gas-works or gas-tanks. The districting or sectioning of a city, as I propose, will therefore become a necessity, and it will be seen that under my invention I am able to supply large quantities of gas in mains of only moderate size, and also to save in the cost of the same through the diminution in the aggregate length of the mains, because in every square the mains are of less longitudinal extent than the square itself, whereas under the ordinary system the mains are in every instance longer than the squares.

It will be perceived that the described system, under which the branch or service pipes are introduced into each dwelling or other building at the rear thereof, and are therein terminated, is quite different and distinct from any system under which it is proposed to extend connections, for any purpose, continuously from house to house by passing them through the cellar-walls or by burrowing under the foundations thereof.

Having thus described my invention, what I desire to claim and secure by Letters Patent is—

1. A gas-supply source within a square of buildings, a main extending lengthwise of such square and within the same for the supply of gas thereto, and a main extending from such supply-source to the interior of an adjacent square, and along the same, for the supply of gas thereto, in combination, substantially as described.

2. Gas-producing works located in the central portion of a block or square of a city, in combination with mains laid through the central portions of the square, and a square or squares adjacent thereto, and the service-pipes branching from such mains and connecting with the buildings upon the squares at the rear end thereof, as described.

3. A system of gas-distribution which comprises gas-mains laid within the interior of each of several squares of buildings, the mains of one square being connected with those of another by mains which extend across the intervening street, and service-pipes which extend from the several interior mains into the several buildings upon such squares.

4. The described means for supplying gas to consumers, which consists in the combination of two or more sections or districts of a city, gas-generators, and mains extending across streets and through squares interiorly,
5 whereby extensive cutting of the streets and excessive length of mains are avoided, substantially as described.

In testimony that I claim the foregoing as my own I hereunto affix my signature in presence of two witnesses.

HENRY C. REW.

Witnesses:
O. E. DUFFY,
EDWARD E. ELLIS.